UNITED STATES PATENT OFFICE.

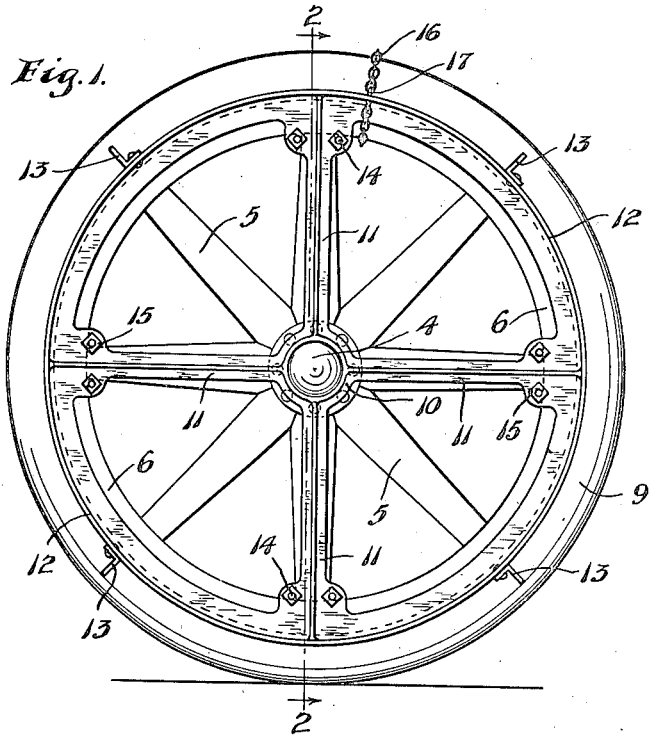
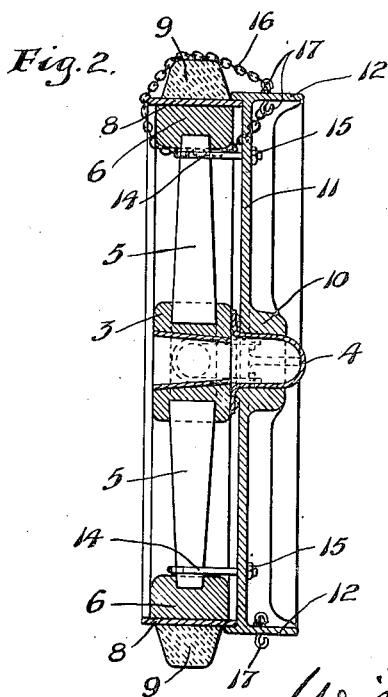

HUGH B. FOLEY, OF MINNEAPOLIS, MINNESOTA.

SUPPLEMENTAL TRACTION-WHEEL.

1,280,200.  Specification of Letters Patent.  Patented Oct. 1, 1918.

Application filed March 22, 1918. Serial No. 224,043.

*To all whom it may concern:*

Be it known that I, HUGH B. FOLEY, a citizen of the United States, residing at Minneapolis, in the county of Hennepin and State of Minnesota, have invented certain new and useful Improvements in Supplemental Traction-Wheels; and I do hereby declare the following to be a full, clear, and exact description of the invention, such as will enable others skilled in the art to which it appertains to make and use the same.

My invention has for its object to provide a simple and efficient supplemental wheel rim which is capable of being easily applied to and removed from the wheel of a motor-propelled vehicle; and to such ends, generally stated, the invention consists of the novel construction and combination of parts hereinafter described and defined in the claims.

The wheels of Ford trucks and various other motor propelled vehicles are provided with projecting wheel hubs or hub caps which, of course, are located at, or concentric to the axis of the wheel rim. In accordance with my invention, I utilize this projected wheel hub or cap as a centering device and centering support for connecting a supplemental rim to the rim proper of the traction wheel, and arrange the rim of the supplemental wheel so that it will telescope slightly with the adjacent edge of the rim of the main wheel. By means of suitable devices such as U-bolts, the supplemental rim when its hub is slipped onto the hub cap and telescoped with the rim of the main wheel, may be secured and quickly attached to said main wheel; and when attached it very greatly increases the load supporting face of the main wheel. The rim of the supplemental wheel, however, is made of less diameter than the periphery of the tire or tread surface of the main wheel so that when running on hard roads it will not be brought into action, but will be brought into action whenever the main wheel sinks slightly into a soft roadbed.

The invention is illustrated in the accompanying drawings wherein like characters indicate like parts throughout the several views.

Referring to the drawings:

Figure 1 is a side elevation showing my improved supplemental rim attached to an ordinary traction wheel such as that of a Ford truck; and Fig. 2 is a vertical section taken on the line 2—2 of Fig. 1.

Of the parts of the main wheel the numeral 3 indicates the hub, the numeral 4, the hub cap, the numeral 5, the spokes, the numeral 6 the felly, the numeral 8 the metal rim, and the numeral 9 the tire which latter is shown as a solid rubber tire. The hub cap 4 has a flanged inner end detachably secured to the hub 3, in the usual or any suitable way as by means of screws or bolts.

The supplemental wheel may be cast integral or built up, but, as shown, it is of the integral cast type and comprises a hub 10, flanged spokes 11, and a rim 12. The hub 10 is of a size to snugly fit around the hub cap 4 and preferably the rim 12 at its inner edge is made to telescope over the projecting adjacent edge of the metal wheel rim 8. The rim 12 is preferably provided with traction lugs 13, the outer edges of which, however, terminate radially inward of the tread surface of the tire 9 so that they will not engage the roadbed when the vehicle is running on a hard road, but will be brought into action whenever the wheel sinks in a soft road.

The numeral 14 indicates U-bolts that embrace the spokes 5 and are passed through perforations in the flanges of the spokes 11, and are provided with nuts 15 which when tightened, tightly clamp the supplemental wheel onto the main wheel.

Obviously, in this arrangement the hub caps accurately center the supplemental wheel in respect to the main wheel, holding the same properly centered, even when there is no telescopic engagement between the rims 8 and 12. The engagement of the said rims 8 and 12, however, greatly relieves the hub cap from load-carrying strains.

It is frequently desirable to use chains around the felly and tire of the main wheel, even when the supplemental wheel is attached. Such chains are indicated by the numeral 16, and their ends are adapted to be conveniently attached to open eye bolts or hooks 17 secured to the rim 12 and projecting both at the interior and exterior thereof. These hooks 17 are preferably provided with threaded nut-equipped ends that adapt them to be easily attached to or detached from the rim 12. These chains, of course, when applied, prevent skidding, even when running on hard, smooth roads.

Preferably, the telescopic engagement between the rims of the supplemental wheel and of the main wheel is made by telescoping the rim of the former over the rim of the latter. This arrangement, with a wheel of the character described, permits the rim of the supplemental wheel to be slipped nearly or quite into engagement with the adjacent side of the rubber tire, and moreover, throws the flange of the supplemental rim below the rim of the main wheel, so that it is subject to the direct downward pressure of the load at the bottom of the wheel.

By carrying the load from the main wheel to the supplemental wheel, both at the rim and at the hub, a very secure connection is made between the main and supplemental wheels and the attaching device is such as the U-bolts are almost entirely relieved from load carrying strains, inasmuch as all that is required of them is to hold the supplemental wheel against lateral displacement.

What I claim is:

1. The combination with a vehicle wheel having a metallic felly rim around its felly and having on said rim a tire of less width than said rim, so that an edge of said rim projects laterally outward from the adjacent side of said tire, a cylindrical supplemental rim detachably telescoped around the projecting edge of said felly rim, to take the shear of the load, and means rigidly but detachably securing said supplemental rim to said main wheel.

2. The combination with a vehicle wheel having a projecting hub, of a supplemental wheel having a hub telescoped onto the hub of the said main wheel and having means for securing it to the said main wheel, the said supplemental wheel having a rim telescoped with the outer edge of the rim of said main wheel.

3. The combination with a vehicle wheel having a projecting hub, of a supplemental wheel having a hub telescoped onto the hub of the said main wheel and having means for securing it to the said main wheel, the said supplemental wheel having a rim telescoped with the outer edge of the rim of said main wheel, the rim of said supplemental wheel having projecting traction lugs and the rim of said main wheel having a tire projecting radially beyond said traction lugs.

4. The combination with a traction wheel having a projecting hub cap, of a supplemental wheel having a hub telescoped onto the said hub cap and nut-equipped U-bolts applied around the spokes of the main wheel and extended through the flanges of the spokes of said supplemental wheel, the rim of said supplemental wheel being telescoped with the outer edge of the rim of the main wheel.

5. The combination with a vehicle wheel having a projecting hub and having a metal rim around its felly and a tire around said rim with the said rim projecting beyond the outer side of said tire, of a supplemental wheel having a hub telescoped onto the hub cap of said main wheel and having a rim telescoped over the projecting outer edge of the metal rim of said main wheel, and means for securing said supplemental wheel to said main wheel.

In testimony whereof I affix my signature in presence of two witnesses.

HUGH B. FOLEY.

Witnesses:
CLARA DEMAREST,
BERNICE G. BAUMANN.